Feb. 6, 1962        J. W. BEAN        3,019,710
HAND MIRROR
Filed June 19, 1959
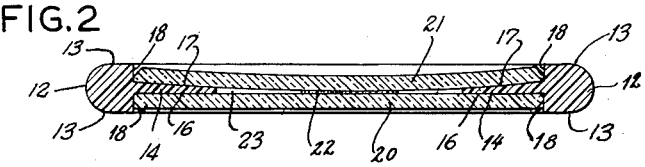
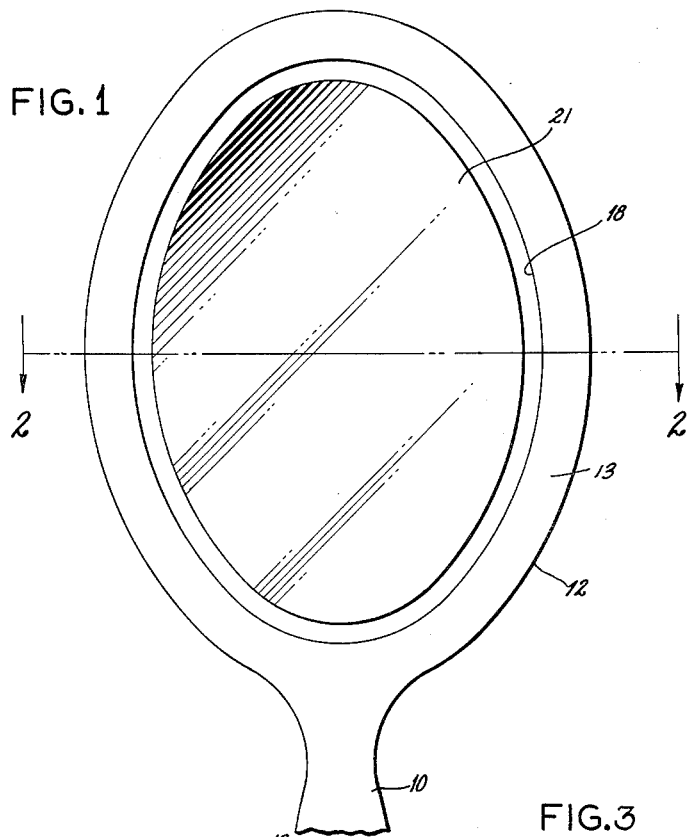
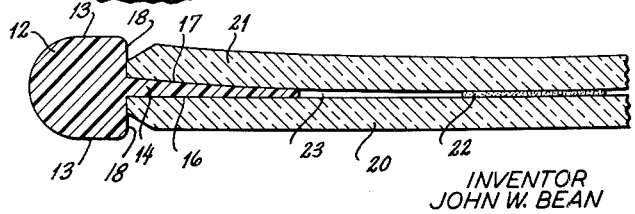
INVENTOR
JOHN W. BEAN
BY Teller & McCormick
ATTORNEYS

3,019,710
HAND MIRROR
John W. Beam, Bloomfield, Conn. (% The Fuller
Brush Co., 3580 Main St., Hartford, Conn.)
Filed June 19, 1959, Ser. No. 821,439
3 Claims. (Cl. 88—89)

The invention relates to double mirrors and more particularly to small personal mirrors mounted in a stand or adapted to be held in the hand.

Heretofore it has been customary in manufacturing small double mirrors, and particularly personal mirrors having one-piece rigid frames, to secure the reflecting glasses in the frame only at the edge portions thereof. Usually the glasses are inserted within the frame and then locked therein by the insertion of a retaining ring which fits over the edge portions of each glass and bears against the inner surfaces of the frame.

Mirrors manufactured in accordance with this prevailing practice have not been completely satisfactory in that the insertion of the locking ring into the frame is difficult and constitutes a costly labor operation materially affecting the cost of manufacturing the mirror. Additionally, frequent failures occurred when mirrors manufactured in this manner were accidentally dropped, as the shock from the impact would frequently jar one or both retaining rings loose, thus permitting the glass to fall out and break. Where the retaining ring was made from a plastic material, still another disadvantage occurred in mirrors made in this manner. Due to the tendency of the material to relieve internal stresses, the bead, or ring, would often "craze," that is, develop many small cracks which spoiled the pleasing appearance of the mirror.

The present invention has for its object the provision of a small double mirror, particularly a personal mirror, in which the above-noted disadvantages are overcome.

More particularly, the present invention has for its object the provision of a double mirror which can be manufactured more easily and at less cost than previously possible. It is also an object of the invention to provide a double mirror in which the insertion of the reflecting glasses into the frame is facilitated. Still another object of the present invention is to provide a double mirror construction which is stronger than that described above and which will more effectively withstand accidental droppage. Still another object of the invention is to improve the appearance of this type of mirror and to reduce the amount of material required in its manufacture.

The mirror embodying a preferred form of the present invention, in general, comprises a molded frame having a continuous peripheral rim preferably uninterruptedly surrounding a central area. A thin web means or web is located between the opposite faces of said rim and extends into at least a substantial portion of said central area, being integrally joined with the rim to provide a recess on each side of the web. A central opening is provided within the web means or web. Firmly retained within each recess is a reflecting glass and the dimensions of the glasses are such that each reflecting glass at least approximately engages the inner edges of the rim and the face of the web. As shown in the drawing and described in detail hereinafter, the reflecting glasses are adhesively retained within the recess by a layer of adhesive joining the back faces of the two reflecting glasses through said central opening.

The drawing shows a preferred embodiment of the invention which will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a plan view of a double hand mirror constituting one embodiment of the invention, FIG. 2 is a transverse sectional view taken along the line of 2—2 in FIG. 1 looking in the direction of the arrows, FIG. 3 is an enlarged sectional view similar to the left portion of FIG. 2.

The mirror shown in FIG. 1 comprises a handle 10 and a rigid unitary frame including a peripheral rim 12 having opposite outer faces 13, 13. The handle and frame may be formed from any suitable material such as methacrylate, acetate and other like substances. The rim 12 is continuous and uninterrupted and it may be oval in shape or of any other suitable configuration.

The rim 12 is integrally joined with a web or web means 14 formed between the planes of the opposite faces 13 of the rim. The web or web means 14 defines two opposite recesses at opposite sides thereof and within said peripheral rim 12 and said web means defines a central opening 23. The web means is shown as being a continuous annular flange which extends throughout a substantial portion of the central area within said rim.

Two reflecting glasses are provided which fit within said recesses at opposite sides of the web means. The glasses have such size and shape that their peripheries are at least approximately in engagement with the interior edges of the rim 12. Preferably, but not necessarily, one reflecting glass 20 is flat and one reflecting glass 21 is concave with a convex back face. The opposed faces 16 and 17 of the web are shaped to correspond to the shape of the backs of the reflecting glasses. When the back of the glass 21 is convex the face 17 is partially concave to uniformly engage said convex back face.

The inner edges 18 of the rim 12 are formed without any inwardly extending projections and said edges are substantially normal to the opposite faces 13, 13 of said rim 12. Therefore, the glasses have their outer faces entirely exposed.

The glasses 20 and 21 are retained by means of a layer 22 of adhesive which directly joins the back faces of the glasses 20 and 21 through said central opening 23. The adhesive serves entirely independently of the rim 12 to retain said glasses in engagement with said web means 14. Any suitable adhesive may be used provided it will not affect the silvered or lacquered back surfaces of the reflecting glasses 20 and 21.

When one of the glasses 21 has a concave outer face and a convex back face as is preferred, said convex back face extends at its central portion into said central opening 23 so as to be closely adjacent the back face of the other glass 20. This enables the two back faces to be joined and retained in place by a minimum amount of adhesive.

The present construction has several advantages over prior known devices in that the insertion of the reflecting glasses in the recesses is a very simple manual operation due to the fact that there are no obstructions in the recesses and it is unnecessary to force a spring retaining member into the recesses to maintain the glass therein. Also, the provision of a web between the rim portions materially strengthens the assembly over that type in which there is no supporting web. Since the frame of the present construction has increased strength due to the presence of the web, it is possible to make the rim narrower and smaller than would otherwise be possible and thereby effect a saving in the amount of material utilized.

The invention claimed is:

1. A double mirror comprising a rigid unitary frame including a peripheral rim having opposite outer faces and surrounding a central area and also including a thin web means integral with said rim and located between the planes of the opposite faces thereof which web means extends into said central area and defines two opposite recesses within said peripheral rim and also defines a central opening, two oppositely facing reflecting glasses located respectively within said recesses with their outer faces oppositely disposed and with their back faces in engagement with said web means which glasses have such size and shape that their peripheries are at least approximately in engagement with the interior edges of said rim and which glasses have their said outer faces entirely exposed, and a layer of adhesive joining the back faces of said two reflecting glasses through said central opening which adhesive serves entirely independently of the rim to retain said glasses in engagement with said web means.

2. A double mirror as set forth in claim 1, wherein the back face of one reflecting glass is inwardly convex and extends at its central portion into said central opening to be closely adjacent the back face of the other oppositely facing reflecting glass.

3. A double mirror as set forth in claim 2, wherein said web means is a continuous annular flange which is shaped at one face thereof to approximately fit the adjacent annular portion of the convex back face of said one reflecting glass.

References Cited in the file of this patent

UNITED STATES PATENTS

| | | |
|---|---|---|
| 846,148 | Schwartz | Mar. 5, 1907 |
| 2,461,190 | Wolff | Feb. 8, 1949 |
| 2,558,848 | Harrison | July 3, 1951 |
| 2,733,637 | Joseph | Feb. 7, 1956 |

FOREIGN PATENTS

| | | |
|---|---|---|
| 768,822 | Great Britain | Feb. 20, 1957 |